United States Patent Office 3,088,807
Patented May 7, 1963

3,088,807
PRODUCTION OF PURE PHOSPHORUS
Forrest V. Williams, Dayton, Ohio, assignor to Monsanto Chemical Company, St. Louis, Mo., a corporation of Delaware
No Drawing. Filed Jan. 3, 1961, Ser. No. 80,044
1 Claim. (Cl. 23—223)

The present invention relates to the production of very pure phosphorus suitable for use in the manufacture of electronic and semi-conductor materials such as intermetallic compounds and phosphorus doped compounds and elements and various types of doped compounds and elements.

It is an object of the invention to prepare phosphorus in a form which is relatively free from impurities and which is more uniform in its electrical characteristics as well as in its chemical derivatives than has been possible by prior art methods.

In the production of elemental phosphorus, it has been found that the chemical elements which occur together with the phosphorus are carried into the product. Examples of such impurities include the halogen elements such as fluorine, chlorine, etc., and also sulfur and tellurium compounds. Certain forms of phosphorus such as the so-called white phosphorus which are stored under water or oil may also pick up impurities therefrom. It has been attempted to purify the elemental phosphorus by distillation, but the conventional distillation processes have been found to offer little improvement in the purity of the phosphorus which is thus obtained.

It has now been found that elemental forms of phosphorus, including both the white and red forms, may be greatly improved in purity by transforming the impure starting phosphorus into a phosphide selected from the group consisting of the higher metal phosphides of the group which form both a higher and a lower metal phosphide, and thereafter decomposing the said higher form to the said lower form at a temperature in the range of from 500° C. to 1500° C. A preferred group consists of the phosphides of silver, cobalt, chromium, copper, iron, molybdenum, nickel, rhenium, rhodium, tantalum, vanadium, tungsten, tin, and zirconium. Such preparation of the aforesaid higher phosphide is carried out by admixture of the said impure elemental phosphorus with the desired metal at a temperature in the range of from 200° C. to 900° C., and thereafter decomposing the higher phosphide.

After the higher metal phosphide of greater phosphorus content has been formed, the separation of the purified phosphorus is conducted by applying at least one of the two conditions of (a) an increased temperature in the range of from 500° C. to 1500° C. and being at least 20° C. in excess, or preferably 50° C. in excess of the temperature of formation of the higher phosphide, and (b) a lower pressure than the pressure at which the said higher phosphide was formed, thus yielding a purified form of phosphorus, and the residual lower phosphide having a lower phosphorus content. It has been found that the impurities present in the crude phosphorus starting material are retained in the stable lower phosphide and that the evolved phosphorus is greatly improved in purity as the result of the decomposition of the higher phosphide, i.e., the phosphide containing the higher proportion of phosphorus. The reaction is therefore

when M is one of the above metals.

The proportions of the metal employed with the impure starting phosphorus are not critical as long as an excess of the said metal is present to react with all of the impure phosphorus and the impurities present therein. The mechanism of the retention of such impurities as compounds or as dissolved components which are probably incorporated in the lattice structure of the said higher metal phosphide, is not clearly understood, but it would appear that such impurities are tenaciously held in the metal phosphide.

The following examples illustrate specific embodiments of the present invention.

*Example 1*

Sixty-two (62) grams (about two moles) of reagent grade red phosphorus and sixty-five (65) grams (about one mole) of reagent grade copper powder were thoroughly and intimately mixed and placed in a fused silica ampoule. The contents were evacuated to at least $10^{-4}$ mm. and sealed off. The ampoule and contents were heated at 400° C. for one and one-half (1½) hours to convert the mixture to copper phosphide.

After conversion to copper phosphide, the ampoule was opened and attached to a fractionation apparatus and vacuum system. The ampoule and contents were heated to about 450° C. under a vacuum of about $10^{-3}$ to $10^{-4}$ mm. About two (2) cc. of white phosphorus was distilled off the copper phosphide. The ampoule and copper phosphide were further heated to about 750° C. About 3–5 cc. of white phosphorus was collected as a forerun. Further heating of the copper phosphide to about 800° C., with a pressure of about 765 mm. resulted in 8–10 cc. of white phosphorus as a middle fraction. This example shows the decomposition of the higher phosphide by increasing the temperature and pressure.

About ten (10) grams of the above purified phosphorus was converted to the compound InP by standard procedures. The electrical properties of this InP were measured. The carrier concentration was $8.5 \times 10^{16}$ atoms/cc., a significant improvement over the value, $3-6 \times 10^{17}$, obtained when untreated phophorus is used to prepare InP.

*Example 2*

Forty-nine (49) grams (about 0.4 mole) of reagent grade tin and thirteen (13) grams (about 0.4 mole) of reagent grade red phosphorus were placed in opposite ends of a fused silica tube, evacuated and sealed off. The end of the tube containing the phosphorus was heated in a tubular furnace to a temperature of about 470° C. The opposite end of the tube, containing the tin in a boat, was heated to about 730° C. After reaction of the elements was complete, the furnace containing the tin phosphide was uniformly cooled at a rate of 40° C. per hour. After cooling to room temperature, the tube was opened and the tin phosphide recovered for further treatment.

The above tin phosphide was treated at a low pressure to recover the phosphorus. The tin phosphide was heated to 475–550° C. under a vacuum of $1 \times 10^{-4}$ to $5 \times 10^{-5}$ mm. Under these conditions, the tin phosphide decomposed into phosphorus vapor and a tin phosphide containing a lower proportion of phosphorus. This example illustrates the decomposition of the higher phosphide by reducing the pressure. When this experiment was conducted with the temperature of decomposition raised to about 750° C., and with the pressure reduced to $1 \times 10^{-6}$ mm. Hg, a similar purification of the evolved phosphorus was obtained.

When the above treated phosphorus was reacted with high purity indium to form indium phosphide, electrical evaluation showed 5.7 to $6.8 \times 10^{16}$ impurity atoms/cc. This can be compared with a value of $3-6 \times 10^{17}$ impurity atoms/cc. which is obtained in InP prepared from untreated phosphorus.

The difference in temperature necessary to form the higher phosphide and the temperature necessary to dissociate the higher phosphide into a lower phosphide and phosphorus is one of the critical factors of the present invention. The other important factor is the phosphorus pressure in both cases. For example, $CuP_2$ is formed by heating the elements at 765° C., if the phosphorus pressure is maintained above 760 mm. Upon heating the $CuP_2$ at 765° C. and pumping the system (i.e., $<10^{-4}$ mm.), the $CuP_2$ dissociates into $Cu_3P$ and $P_4$. Some data are given below which shows the temperature at which some higher metal phosphides have been found to have dissociation pressures of phosphorus of 760 mm.

| | °C. |
|---|---|
| $AgP_2$ | 551 |
| $AgP_3$ | 515 |
| $CoP_3$ | 1086 |
| $CrP_2$ | 700 |
| $CuP_2$ | 765 |
| $FeP_2$ | 991 |
| $MoP_2$ | 992 |
| $NiP_3$ | 662 |
| $ReP_2$ | 1083 |
| $ReP_3$ | 954 |
| $RhP_3$ | 1450 |
| $TaP_2$ | 864 |
| $VP_2$ | 711 |
| $WP_2$ | 1081 |
| $ZrP_2$ | 891 |

What is claimed is:

The process for the purification of elemental phosphorus containing at least one of the impurities of the group of fluorine, chlorine, sulfur and tellurium compounds, which comprises contacting the said impure phosphorus with an excess of a metal selected from the group consisting of silver, cobalt, chromium, copper, iron, molybdenum, nickel, rhenium, rhodium, tantalum, vanadium, tungsten, tin, and zirconium at a temperature in the range of from 200° C. to 900° C. to form the metal phosphide, and thereafter thermally decomposing the said phosphide by applying at least one of the two conditions of (a) an increased temperature in the range of from 500° C. to 1500° C. and being at least 20° C. in excess of the temperature of formation of the higher phosphide, and (b) a lower pressure than the pressure at which the said higher phosphide was formed, thus yielding purified phosphorus and with the retention of at least a portion of the said original impurities in the said lower valent metal phosphide.

References Cited in the file of this patent

Mellor's, A Comprehensive Treatise on Inorganic and Theoretical Chemistry, vol. 8, 1928 Edition, pages 833, 835, 836, 838–840, 849, and 850, Longmans, Green & Co., N.Y.